United States Patent Office 3,790,637
Patented Feb. 5, 1974

3,790,637
PROCESS FOR THE MANUFACTURE OF VANILLIN FROM SULFITE WASTE LIQUOR
Chang-Tsing Yang, Hackensack, N.J., assignor to American Cyanamid Company, Stamford, Conn.
No Drawing. Filed May 4, 1972, Ser. No. 250,388
Int. Cl. D21c 11/02
U.S. Cl. 260—600
12 Claims

ABSTRACT OF THE DISCLOSURE

Vanillin is made by oxygenating sulfite waste liquor at a substantially neutral pH (i.e., between pH 5.5 and 8) in the presence of a water-insoluble solvent for vanillin to effect removal thereof.

---

The present invention relates to a process for the manufacture of vanillin. More particularly it relates to a process for the manufacture of vanillin from sulfite waste liquor without necessary formation of sodium lignosulfonate.

Sulfite waste liquor is the liquid effluent from the sulfite process for the manufacture of cellulose fibers from wood. Typically, sulfite waste liquor contains 10%–15% solids, of which half to two-thirds is lignin, the remainder being principally one or more metal sulfites, one or more metal bisulfites, soluble mono- and polysaccharides (herein termed "sugars"), and sulfurous acid. In the course of disposal the liquor is concentrated to about 50%–60% solids content. The liquor is very acidic, and typically has a pH in the range of about 0.5–2.

The discovery was made many years ago that vanillin can be produced from the lignin content of sulfite waste liquor by rendering the liquor strongly alkaline and then subjecting it to the action of oxygen (i.e., oxygenating it), preferably under pressure at elevated temperature [cf. Töppel, Die Technische Herstellung von Vanillin aus Sulfitablauge (Das Papier, March 1961, pp. 81 ff.)]. In each instance sufficient alkali (usually sodium hydroxide) is added to raise the pH of the liquor above 12. As a result, the vanillin is produced as sodium vanillinate, which is converted to vanillin by the action of added acid in a separate step. The cost of the sodium hydroxide used in the first step and the cost of the acid used in the second step are considerable, to which must be added the cost of the labor and capital equipment needed to provide these materials as needed.

The discovery has now been made that vanillin is obtained directly when sulfite waste liquor is oxygenated (i.e., when it is subjected to the action of molecular oxygen) at a substantially neutral pH, i.e., when the liquor has a pH in the range of 5.5 to 8. As a result, need for strong alkali and for acid is greatly decreased or if desired, eliminated, and the vanillin is produced as such, with little or no sodium vanillinate.

It is an advantage of the process that it is compatible with the presence of oxidation catalysts in the reaction mixture, so that oxidation of the lignin to vanillin can be performed under catalyzed conditions.

It is a further advantage of the process that it is effective both on untreated sulfite waste liquor and on sulfite waste liquor from which the normal sugar content has been removed.

It is a still further advantage of the process that it permits the reaction mixture to contain one or more inert extractive volatile solvents for vanillin. As a result, at the end of the reaction vanillin can be recovered by allowing the mixture to stand so that a solvent layer forms, withdrawing the layer, and evaporating the solvent therein. The residue comprises vanillin.

As stated, the liquor used for the process may, but need not, contain the sugar normally present in waste sulfite liquor. The liquor may be substantially free from sugar, and such liquor is currently produced by subjecting the sugar to fermentation and then if desired distilling off the alcohol thereby produced. The resulting liquor has an alkaline pH, typically about 8, and is suitable for the oxidation treatment of the present invention.

More in detail, the invention consists essentially in oxygenating sulfite waste liquor adjusted to a pH within the range of 5.5 to 8. The product is an aqueous solution comprising vanillin. The vanillin may be recovered in any convenient way, but the way in which it is recovered is not a primary feature of the invention.

The oxygen may be supplied in the form of air, or in pure form.

The oxygenation step may be performed in any convenient way, and thus the step may be performed by repetitively spraying the liquor through air at room temperature, or by sparging the liquor in an open vessel with air. Under these conditions, however, the reaction proceeds very slowly. It is therefore preferred to perform the reaction at elevated temperature under pressure in an autoclave or other pressure vessel. Temperatures up to 200° C. and pressures up to at least 200 lb./in.$^2$ can be employed, and no reason is seen why these ranges cannot be exceeded with still more rapid reaction times. Temperatures in the range of 100° C.–200° C. and pressures in the range of 100 to 200 lb./in.$^2$ give good results and are therefore preferred. The pressures referred to are gauge pressures and include the partial pressures of nitrogen and solvent where present.

The speed of reaction is favored by creating a large oxygen-liquor interface. Accordingly, it is preferred to introduce the oxygen gas through a sparger at the bottom of the autoclave (to ensure delivery of the gas in the form of fine bubbles) and to constantly bleed off gas from the upper part of the reaction vessel so as to maintain the concentration of oxygen in the liquor at a desirably high level.

The speed of the reaction is accelerated when an oxidation catalyst is present in the reaction mixture. Suitable catalysts for the purpose include copper oxide, copper sulfate, cobalt oxide, cobalt nitrate, nickel oxide, nickel nitrate, cerium oxide, lead oxide, manganese dioxide, manganese nitrate, ferric sulfate, ferric nitrate, ferric chlorite, and soluble peroxy compounds for example, sodium persulfate, sodium perborate, hydrogen peroxide, sodium peroxide, peracetic acid, perbenzoic acid, and cumene, which is converted by oxygen to cumene hydroperoxide.

The starting reaction mixture may advantageously contain a non-oxidizable water-insoluble volatile solvent for vanillin, the action of which is to withdraw part of the vanillin from the reaction medium as it is formed and so accelerate the reaction and also simplify recovery of the vanillin. Suitable solvents for the purpose include heptane, octane, gasoline, cyclohexane, and cycloheptane; di-, tri- and tetrachloroethane, and dichlorodifluoroethane; benzene, toluene, and diphenyl; tetrahydrofurane and dihydrofurane; and pyrolidene.

The oxygenation step is continued to the point where the rate of production of vanillin becomes slow, at which point the reaction is regarded as completed.

The vanillin is recovered in any convenient way after completion of the oxygenation step. When a water-insoluble solvent for the vanillin is present, the solvent containing most of the vanillin) is allowed to float or sink as a separate layer and is then drawn off. If desired, the vanillin remaining in the liquor can be recovered by one or more additional solvent extraction steps employing the same or different solvent.

The invention is further described in the examples which follow. These examples are preferred embodiments of the invention and are not to be construed in limitation thereof.

EXAMPLE 1

The starting liquor is sulfite process waste liquor (containing 12% total solids by weight of which about 60% is lignin) having a pH of about 2. To this liquor is added sufficient strong sodium hydroxide to adjust the pH to 7. The resulting mixture is placed in a laboratory rocking autoclave, the head of which is connected to a source of high-pressure air through a reduction value. The autoclave is heated to 175° C. and compressed air is supplied to the autoclave at a pressure of 175 lb./in.² (gauge). After four hours the supply of air to the autoclave is discontinued and the autoclave is opened when cool. The vanillin content of the autoclave product is recovered by successive extractions with n-butanol, the extracts being combined and the butanol being distilled off.

EXAMPLE 2

The procedure of Example 1 is repeated except that 100 cc. of benzene is added to the reaction mixture, and the vanillin is recovered by allowing the benzene to separate as a supernatant layer, drawing off the benzene, and evaporating the benzene.

EXAMPLE 3

The procedure of Example 2 is repeated except that 10 g. of an oxidation catalyst (potassium persulfate) is dissolved in the liquor before it is introduced into the autoclave, and the reaction time is decreased to 150 minutes.

EXAMPLE 4

The procedure of Example 2 is repeated except that 10 g. of cupric sulfate is dissolved in the starting liquor and the reaction time is decreased to 150 minutes.

EXAMPLE 5

The procedure of Example 2 is repeated except that the starting liquor is sulfite waste liquor which has been fermented to convert the sugar therein to ethanol, and the ethanol has been removed by azeotropic distillation. Substantially the same results are obtained.

I claim:
1. A method for the production of vanillin which consists essentially in oxygenating sulfite waste liquor at a pH between 5.5 and 8 in the presence of a water-insoluble inert solvent for vanillin.
2. A process according to claim 1 wherein the liquor is oxygenated with air.
3. A process according to claim 1 wherein the sulfite waste liquor has a solids content between 10% and 15%.
4. A process according to claim 1 wherein the temperature of the liquor during oxygenation is between 100° C. and 200° C.
5. A process according to claim 1 wherein the gas pressure over the liquor during oxygenation is between 100 and 200 lb. per square inch.
6. A process according to claim 1 wherein the pH of the liquor during oxygenation is about 7.
7. A process according to claim 1 wherein the liquor contains an oxidation catalyst during oxygenation.
8. A process according to claim 7 wherein the catalyst is sodium persulfate.
9. A process according to claim 7 wherein the catalyst is sodium peroxide.
10. A process according to claim 1 wherein the solvent is benzene.
11. A process according to claim 1 wherein the sulfite cellulose waste liquor contains substantially no sugar.
12. A process according to claim 1 wherein the solvent is diphenyl.

References Cited
UNITED STATES PATENTS

| | | | |
|---|---|---|---|
| 3,054,825 | 9/1962 | Craig et al. | 260—600 |
| 2,516,827 | 7/1950 | Marshall et al. | 260—600 |
| 2,544,999 | 3,1951 | Marshall et al. | 260—600 |
| 2,057,117 | 10/1936 | Sandborn et al. | 260—600 |
| 2,745,796 | 5/1956 | Toppel | 260—600 |

OTHER REFERENCES

A.P.C. application of Freudenberg et al., Ser. No. 318,386, published Apr. 20, 1943.

S. LEON BASHORE, Primary Examiner

A. L. CORBIN, Assistant Examiner

U.S. Cl. X.R.

162—16, 65